United States Patent
Graf et al.

(10) Patent No.: US 7,024,250 B2
(45) Date of Patent: Apr. 4, 2006

(54) METHOD AND APPARATUS FOR THE SYNCHRONOUS CONTROL OF MANIPULATIONS

(75) Inventors: Stefan Graf, Zusamaltheim (DE);
Andreas Hagenauer, Friedberg (DE);
Michael Chaffee, Gaines, MI (US);
Kenneth Stoddard, Rochester Hills, MI (US)

(73) Assignee: KUKA Roboter GmbH, Augsburg (DE)

( * ) Notice: Subject to any disclaimer, the term of this patent is extended or adjusted under 35 U.S.C. 154(b) by 304 days.

(21) Appl. No.: 10/438,062

(22) Filed: May 14, 2003

(65) Prior Publication Data
US 2004/0030452 A1    Feb. 12, 2004

(30) Foreign Application Priority Data
Aug. 6, 2002   (DE) ................ 102 35 943

(51) Int. Cl.
*G05B 11/01*   (2006.01)

(52) U.S. Cl. ............ 700/19; 700/2; 700/3; 700/9; 700/20; 700/56; 700/169; 700/245; 700/247; 700/248; 700/249; 700/253; 713/375; 318/567; 318/568.11; 318/568.2; 901/6; 901/8

(58) Field of Classification Search ............ 700/3, 700/9, 19, 20, 56, 245, 247, 248, 249, 253, 700/169, 2; 901/6, 8; 318/568.1, 568.11, 318/568.2, 567, 568.21; 713/375
See application file for complete search history.

(56) References Cited

U.S. PATENT DOCUMENTS

| | | | | |
|---|---|---|---|---|
| 4,288,849 A | * | 9/1981 | Yoshida et al. | 700/3 |
| 4,633,385 A | * | 12/1986 | Murata et al. | 700/86 |
| 4,754,427 A | * | 6/1988 | Okayama | 700/3 |
| 5,084,826 A | * | 1/1992 | Hariki et al. | 700/248 |
| 5,173,648 A | * | 12/1992 | Kawamura et al. | 318/568.13 |
| 5,204,942 A | * | 4/1993 | Otera et al. | 700/248 |
| 5,254,923 A | * | 10/1993 | Kanitani | 318/568.11 |
| 5,450,573 A | * | 9/1995 | Gronemeyer | 713/375 |
| 5,798,627 A | * | 8/1998 | Gilliland et al. | 318/568.14 |
| 5,825,981 A | * | 10/1998 | Matsuda | 700/248 |

FOREIGN PATENT DOCUMENTS

| | | |
|---|---|---|
| EP | 1 090 722 | 4/2001 |
| EP | 1 186 386 | 3/2002 |

* cited by examiner

*Primary Examiner*—Anthony Knight
*Assistant Examiner*—Douglas M. Shute
(74) *Attorney, Agent, or Firm*—McGlew and Tuttle, P.C.

(57) ABSTRACT

A method for the synchronous control of several manipulators, such as several industrial robots, is characterized in that control units of specific manipulators exchange control information according to the data structures contained in a corresponding control program, through which control units to be synchronized and synchronization points in the control programs taking place there can be clearly identified, and in that on reaching and synchronization points the program sequence in the control units to be synchronized is continued according to the contents of the data structures in conjunction with the already exchanged control information or stopped until corresponding information arrives from other control units to be synchronized.

15 Claims, 7 Drawing Sheets

METHOD AND APPARATUS FOR THE SYNCHRONOUS CONTROL OF MANIPULATIONS

FIELD OF THE INVENTION

The invention relates to a method for the synchronous control of several manipulators, such as several industrial robots. It also relates to an apparatus for the synchronous control of a manipulator, such as an industrial robot, in a group of interconnected control units of a plurality of manipulators having storage means at least for storing a control program for the manipulator, communications means for transmitting and receiving control information to and from other control units to be synchronized and processor means for executing the control program as a function of the control information received.

BACKGROUND OF THE INVENTION

In industrial practice in the case of widely used manipulators, e.g. industrial robots, it is necessary in certain manipulating processes for them to perform mutually coordinated, i.e. synchronous movements or the like. This is e.g. the case if two robots are used for joining and a third robot for welding the joined articles. For this purpose it is necessary in known industrial robots to at least temporarily synchronize regularly present programmable control units, so that at least during certain critical phases a clearly defined, relative movement sequence is ensured.

For this purpose the control programs of known cooperating manipulators contain specific synchronization instructions, which are translated by the interpreter programs transmitting the control program in specific machine instructions and there are then specific method sequences for synchronizing the corresponding manipulators.

In known methods inputs and outputs of robot control units are used for synchronization between the robots. A communication can take place both by means of field bus systems and by means of directly wired inputs and outputs of the control units. This specifically means that the control program for a manipulator contains one or more synchronization instructions and then by means of the operated communication hardware corresponding synchronization signals are transmitted directly to the inputs of affected, other control units.

It is considered disadvantageous in this connection that the handling of inputs and outputs is complicated and error-prone. In addition, there are additional system engineering costs, because the physical inputs and outputs or the field bus system must firstly be made available. The control units to be synchronized must also be constructed in coinciding manner so that the particular inputs and outputs have the same significance, which restricts the possible uses of such methods. As the control units do not normally communicate with one another directly by means of a field bus, but instead by means of an interconnected stored programmable system control (system SPC) the latter must take account of a corresponding mapping of the inputs and outputs.

Thus, an extended communication between cooperating control units, apart from a modification to the control programs, also involves an adaptation of the input and output configuration, linked with additional lines in the case of physical inputs and outputs, additional programming costs for the SPC, etc. The synchronization points within the program, i.e. program points where there are synchronization instructions, must be clear and unambiguous, so that it is necessary in known synchronization methods to use an individual output for each synchronization point, because otherwise in the case of a set or record selection within the control program, i.e. a selection of specific program parts, which correspond to a specific geometrical position of the manipulator, the synchronization can take place at an incorrect geometrical position.

Methods for the synchronous control of cooperating robots are e.g. known from EP 1 186 386 A2 and EP 1 090 722 A2. The aforementioned documents disclose the synchronous working of a plurality of robots, which as a function of their instantaneous operation can be subdivided into master robots, slave robots and "normal", i.e. independent robots. By means of communication lines there is an active exchange of position data and interpolation data (on-line calculated intermediate positions of movements with a high time density), which the master regularly transmits to all the slaves, so that on a higher hierarchic plane the control unit of the master robot performs a master control function for all participating robots.

The master-slave concept is more particularly considered to be disadvantageous, because in this way a robot or a control unit must participate in every synchronization, so that there is a restriction during practical use regarding the flexibility of such a synchronization concept. In this connection EP 1 090 722 A2 discloses a synchronous control unit for several robots and their controls, which as a function of the group formed (group in connection with a specific application of robots to be synchronized), can either be used as a master, a slave or group-independent. For this purpose several complete, independent program sequences are loaded or stored in each control unit (master program, slave program, normal program), whereof in each case one is processed depending on the group formed. Therefore the program sequences must be coordinated and fixed from the outset.

In addition, all the participating robots, i.e. masters and slaves, wait for one another following a specific number of synchronously performed interpolation steps before there is a further programming or movement. Thus, all the synchronous sequences are time-lengthened, because in certain circumstances some robots are prevented from performing additional operations in the meantime or all the robots must wait for the slowest.

Furtheron, the continuous transmission of position and interpolation data implemented in the prior art is complicated and fault-prone from the data-engineering standpoint. Whilst obviating the aforementioned disadvantages, the problem of the invention is to provide a flexible method and an apparatus suitable for the performance thereof for the synchronous control of manipulators, accompanied by the simplification of communications between two or more control units, whilst ensuring a reliable reaction of the control program in the case of set selection. The invention is based on the further problem of making synchronization processes more reliable from the control engineering standpoint and of shorter duration.

SUMMARY OF THE INVENTION

In the case of a method of the aforementioned type, the problem is solved in that the control units of specific manipulators exchange control information according to data structures contained in a corresponding control program, through which control units to be synchronized and synchronization points in the control programs taking place there can be clearly identified, and that on reaching the synchronization points the program sequence in the control units to be synchronized is continued according to contents of the data structures in conjunction with already exchanged control information or is interrupted up to the arrival of corresponding information from other control units to be synchronized.

For solution purposes the invention also provides an apparatus of the aforementioned type, wherein the storage means additionally store a plurality of control-relevant data structures, wherein through the control data contained in the data structures synchronization points in the control program and the control units to be synchronized are clearly identifiable, wherein the transmission times of the control information correspond to the times of reaching the synchronization points, and wherein the program sequence in the processor means or a corresponding movement of the manipulator can be continued according to the control data contained in the data structures in conjunction with already exchanged control information or can be stopped at least up to the reception of corresponding information from other control units to be synchronized.

As a result of the control method or apparatus according to the invention interconnected configured control devices of manipulators can be synchronized in a random manner without complex and error-prone hardware requirements. With respect to the sequence of the control programs synchronization is clearly fixed, so that in the case of a set selection within the control programs there can be no conflicts between the manipulators to be synchronized such as collisions. According to a further development of the invention the exchange of control information between balanced control units takes place on a common hierarchic level. Consequently there is no master control unit, which must necessarily participate in every synchronization. Instead all the participating control units are flexibly synchronizable with one another without it being necessary to fix beforehand specific program constellations or without it being necessary to store in the control units multiple program sequences.

In order to make the synchronization method according to the invention as simple and efficient as possible, according to a preferred further development of the invention by means of the data structures at least identification data for the synchronization points, option data for program sequence control and address data of the control units to be synchronized are defined.

The identification data are, according to a further development of the invention, preferably strings through which the synchronization points can be clearly identified within a program. According to a further development of the inventive control method, the control information indicate the reaching of a synchronization point by the transmitting control unit. According to the invention, the further program sequence is obtained in conjunction with the contents of the data structures contained in the control units.

According to a preferred further development of the invention, the option data are simple binary digits, i.e. bits, which can assume the values 0 and 1. The option data make it possible to inform the control unit how the robot has to behave on reaching a synchronization point.

The address data are preferably in the form of a list of IP addresses.

The control units preferably communicate with one another through the use of Ethernet technology and the UDP protocol for data transmission. The user datagram protocol (UDP) communication protocol is related to the frequently used TCP/IP protocol, but allows a higher transmission rate due to lower management expenditure. The control information to be transmitted are packed in datagrams of specific maximum size and addressed by means of the IP addresses, which clearly identify a computer (a control unit). Therefore, according to a further development of the apparatus according to the invention, the control information at least contain identification data for the synchronization points reached and address data for identifying the transmitting apparatus. Thus, the invention ensures a rapid, standardized information transmission between the control units to be synchronized.

Information transmission takes place by means of a communication network with star topology, which for this purpose preferably has a hub.

BRIEF DESCRIPTION OF THE DRAWINGS

The invention is described in greater detail hereinafter relative to the attached drawings, wherein show:

FIGS. 1a, b, c Path-time diagrams to illustrate cooperation between three manipulators with temporary synchronization.

DETAILED DESCRIPTION OF THE DRAWINGS

Figures 1A, 1B, 1C:
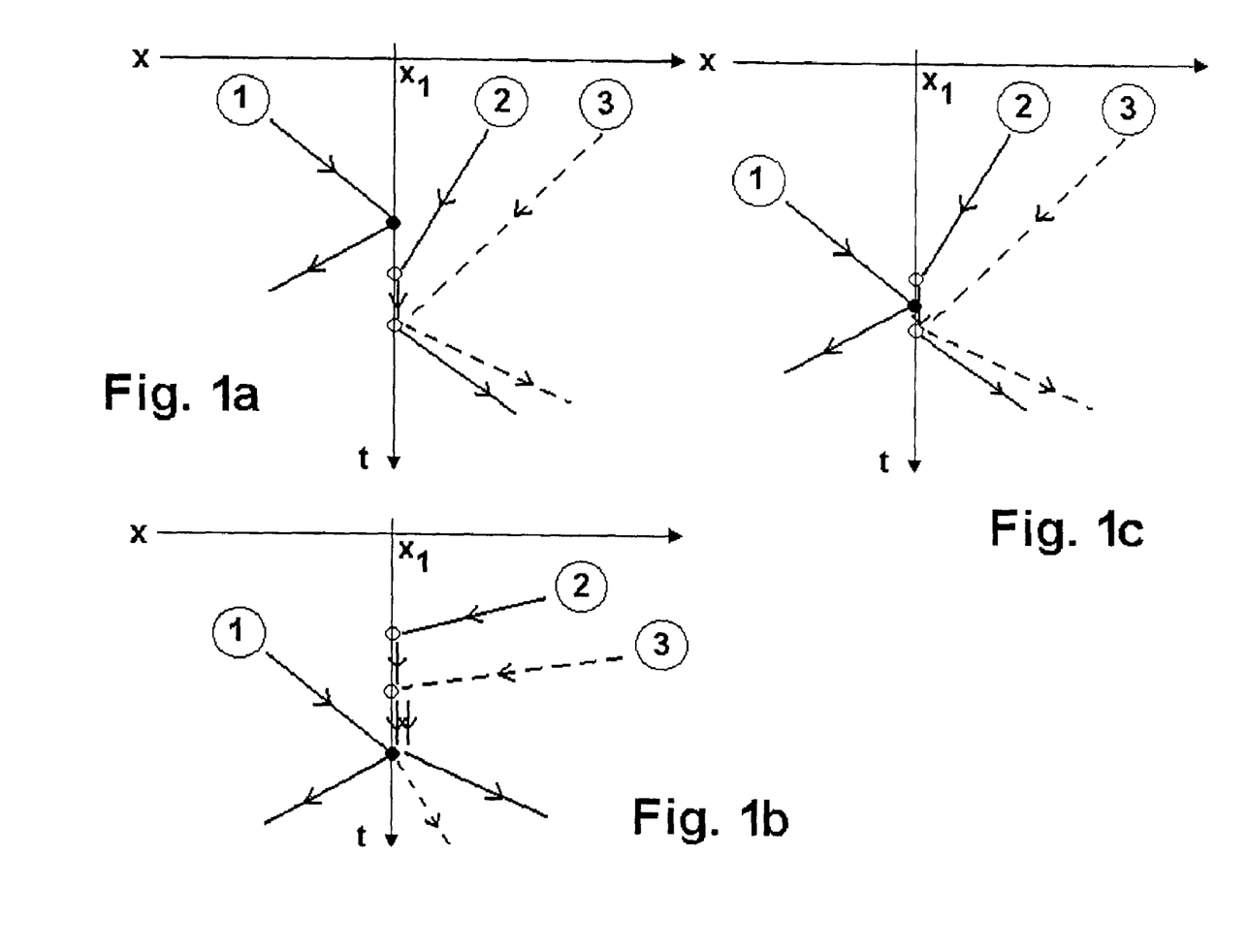

FIG. 1 schematically illustrates the facts in connection with the synchronization of cooperating robots 1, 2, 3 by means of path-time diagrams. The space coordinates of a robot movement are designated x and the time coordinates t. Solid or broken lines correspond to robot movements in space and time. Horizontal lines parallel to the t axis indicate that the corresponding robots 1, 2, 3 are spatially stationary and there is only a "movement" in the time coordinate t, i.e. the robot waits at a specific location x.

In the situations shown in FIGS. 1a) to c) three robots 1, 2, 3 are to be synchronized. Robots 2 and 3 must wait for one another and it must be ensured that robot 1 has already been at the synchronization point. It may be necessary to wait for robot 1. This corresponds to a situation in which robots 2 and 3 jointly handle an article, which was previously deposited by robot 1 at a specific location. Following deposition robot 1 can immediately fetch a new article, i.e. it does not have to wait for robots 2 and 3.

In FIG. 1a) robot 1 arrives at location $x_1$ before robots 2 and 3, deposits the article there (black dot) and then continues its movement. Shortly thereafter robot 2 arrives at the same location (upper circle) and waits there for the arrival of robot 3 (lower circle). Robots 2 and 3 then jointly handle the article delivered by robot 1 and subsequently can continue their movements, optionally separate from one another.

In the case of FIG. 1b) robot 2 arrives first, followed by robot 3 at location x, so that both robots must jointly wait for robot 1. Finally in FIG. 1c) one of the robots 2, 3 arrives at the agreed location $x_1$ before robot 1 and waits there for the other robot synchronized with it, whereas robot 1 continues its movement independently thereof.

In the case of the above-discussed examples of FIGS. 1a) to 1c), the predetermined location $x_1$ at which the movement paths of robots 1, 2, 3 meet and which in the representation provided is determined by the intersection of the t axis with the x axis, corresponds to a corresponding point in the given control program for each of the robots 1, 2, 3. It is therefore necessary that at this point in the program robots 2 and 3 are provided with an instruction to in each case await the other robot and it is also necessary to take into account whether robot 1 (as in FIG. 1a)) has already been at the synchronization point or whether robot 1 (as in FIGS. 1b) and 1c)) has not yet reached this point and consequently robots 2 and 3 (FIG. 1b)) or robot 2 (FIG. 1c)) must wait for it.

Figure 2:
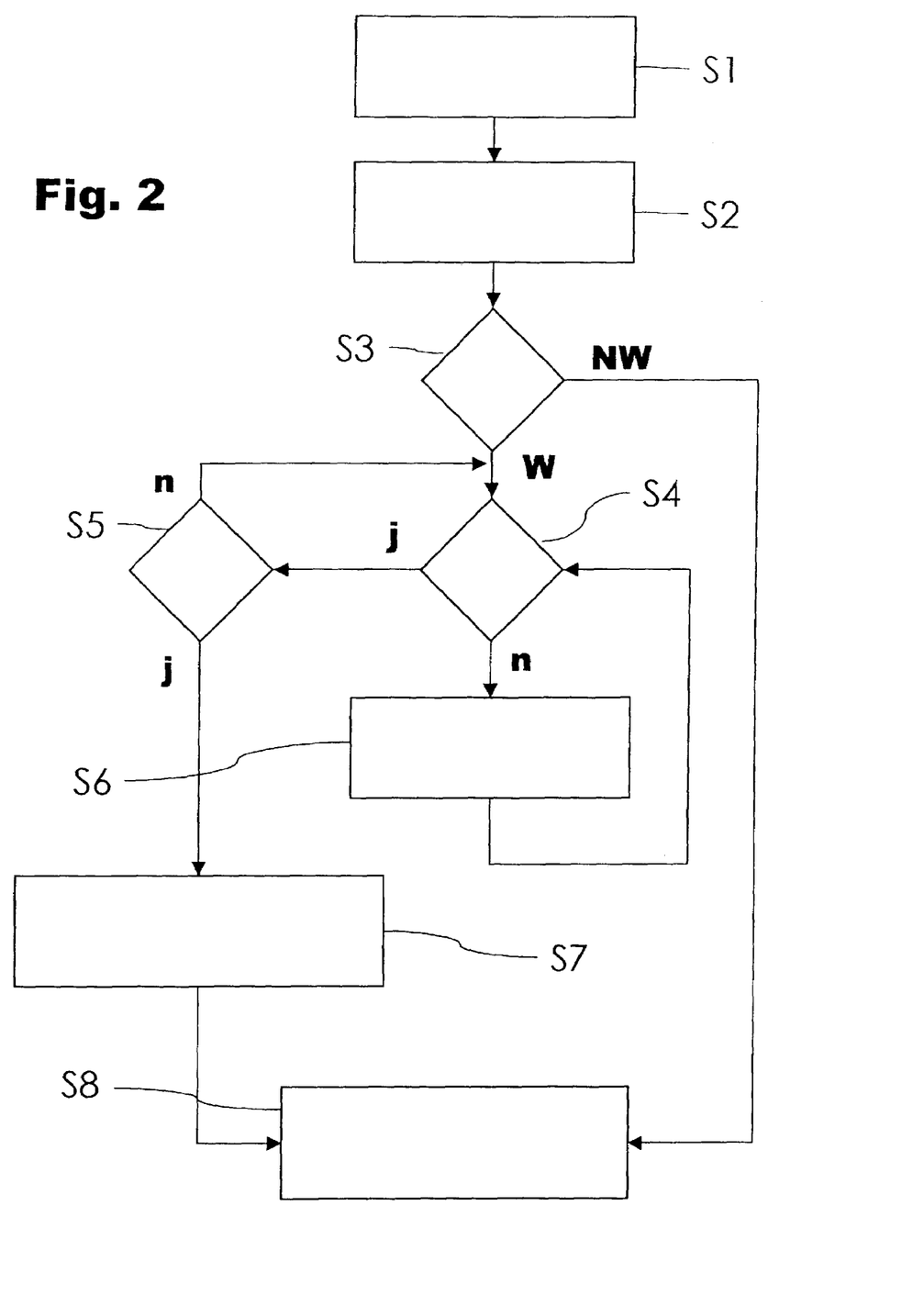
FIG. 2 A sequence diagram for the synchronization method according to the invention.

These facts are again given in FIG. 2 by means of a flow diagram for a synchronization process according to the invention. During the first step S1 within the control program the instruction is given to the corresponding robot control unit to synchronize with other control units participating in synchronization whilst taking account of certain optional parameters, and the instruction, i.e. the synchronization point is clearly indicated by an identification string. Then, in step S2, all the participating robots are supplied with the information that the particular robot in whose control unit the represented processes are taking place has reached the synchronization point. Whilst taking account of the contents of step S1, a check is made in step S3 as to how the control unit or robot has to behave at the synchronization point. If the robot has to wait W (cf. robot 2 in FIGS. 1b), 1c)), in step S4 there is a query as to whether the other robots participating in the synchronization have indicated their arrival at the synchronization point and then (j) optionally the identification strings of the incoming messages are checked for coincidence in step S5. Otherwise following on to step S4, in step S6 a wait message can be issued to the user, e.g. in the form of a display, an optical or acoustic signal, a log file entry, etc. Then the control program returns to step S4 and repeats the same (and optionally also step S6) in loop-like manner until all the messages are present. If in step S5 there is no coincidence of the identification data of the incoming messages (n), the control program also returns to step S4. Otherwise (j) the wait message is optionally erased (step S7) and program execution is continued in step S8. An initial negation (n) of the query S3 leads the program directly to step S8, because in this case there is no need for the corresponding robot to wait.

Figure 2A:
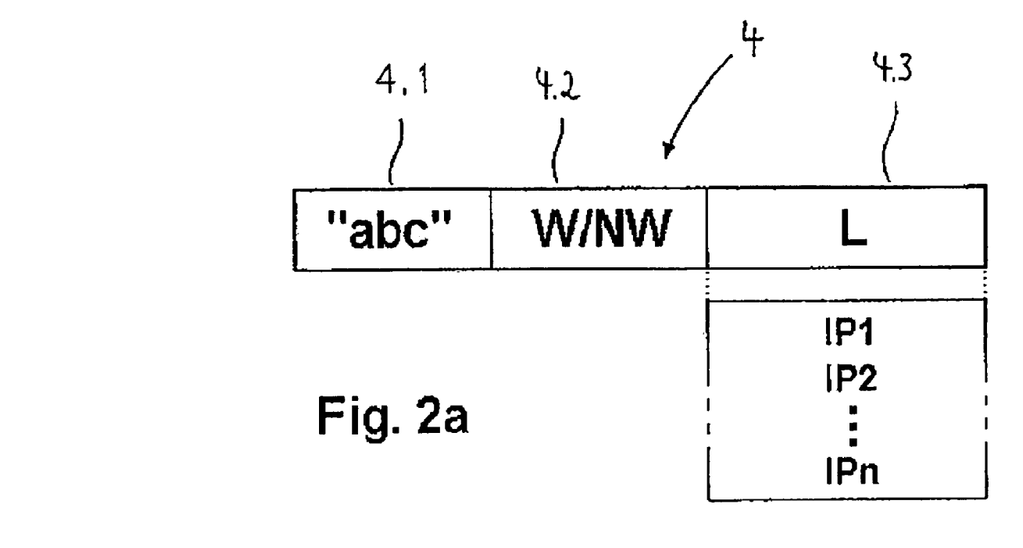
FIG. 2a A diagrammatic representation of the data structure used in the method according to the invention.

The synchronization instruction of step S1 is diagrammatically shown in FIG. 2a) and is in the form of a data structure 4, which comprises individual data entries 4.1–4.3, namely an identification string 4.1 for the clear and unambiguous identification of the particular synchronization point in a program sequence, a binary option character 4.2 (wait option) and a control list 4.3 of the control units participating in the particular synchronization.

String 4.1 is an alphanumeric string and is used for clearly identifying within a control program specific synchronization points. The user gives each of the programmed synchronization points a clear and appropriate name ("start", "fetch", "end", etc.). The same synchronization point must then have the same name in the other control units participating in synchronization, so that a synchronization with this synchronization point is possible and there is certainty in the case of a set selection within the program.

As a simple binary digit the wait option 4.2 can only assume the values 0 and 1, i.e. it is set (value 1) or not set (value 0). The latter case is also called the setting of a no-wait option. If the wait option is set (value 1), the corresponding control unit waits until all the other control units participating in the synchronization and therefore indicated in the control unit list 4.3 have also reached the synchronization point, i.e. have transmitted their corresponding messages (cf. FIG. 2). If, however, e.g. in the control unit of robot 1 the no-wait option has been set (value 0) said specific control unit does not wait until all the other control units participating in the synchronization have also reached the synchronization point and have given their corresponding messages, but instead merely indicates to the other control units that it has already arrived at the synchronization point and then continues its program execution or the robot movement, whilst the other control units indicated in the control unit list 4.3 of robot 1 and for which the wait option has been set must wait for the control unit nominated in exemplified manner.

The control unit list 4.3 is in the form of a list of IP addresses of control units participating in a synchronization. These are the IP addresses to which the control unit transmits the aforementioned messages when it has itself reached the synchronization point and for whose messages it is possibly waiting (with wait option set). The transmission of the message is independent of whether the corresponding control unit subsequently interrupts program execution (wait option) or continues with program execution (no-wait option).

Figure 2B:
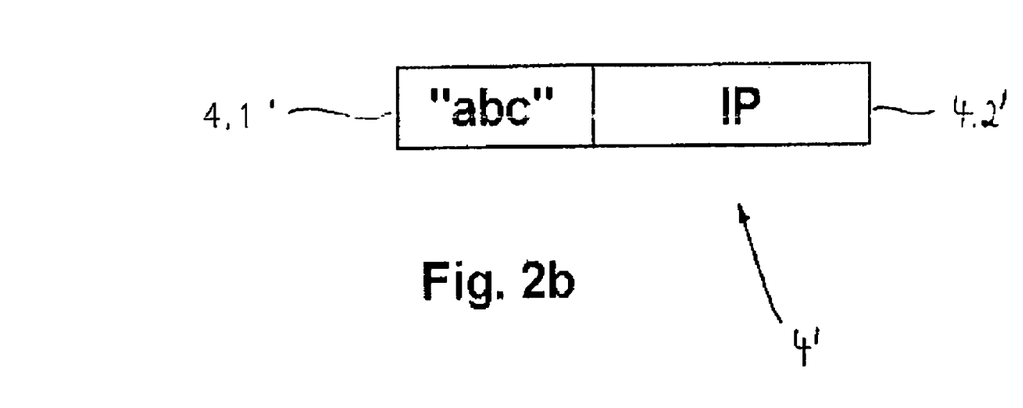
FIG. 2b A diagrammatic representation of the control information used in the method according to the invention.

FIG. 2b diagrammatically shows a control information 4' according to the invention as transmitted or exchanged by the participating control units on reaching a synchronization point.

A control information 4' according to the invention is a data packet, whose contents 4.1', 4.2' can be used by the receiving robot control units for control purposes (cf. FIG. 2). The control unit information 4' at least contains identification data for the synchronization points reached and the address data for identifying the transmitting apparatus.

The identification data 4.1' are preferably in the form of an alphanumeric string through which it is possible to clearly identify the synchronization point where the information 4' has been transmitted.

The address data 4.2' are preferably in the form of an IP address of the transmitting control unit, so that the receiving control units can clearly establish which control unit has transmitted the control information 4'.

In the case of a set wait option (cf. FIG. 2) it is necessary for a control unit to receive such information packets 4' from all the other control units participating in the synchronization and which are tabulated in list 4.3 of the data structure 4 of the control unit before it is possible to continue with programming in the control unit.

Figure 3:
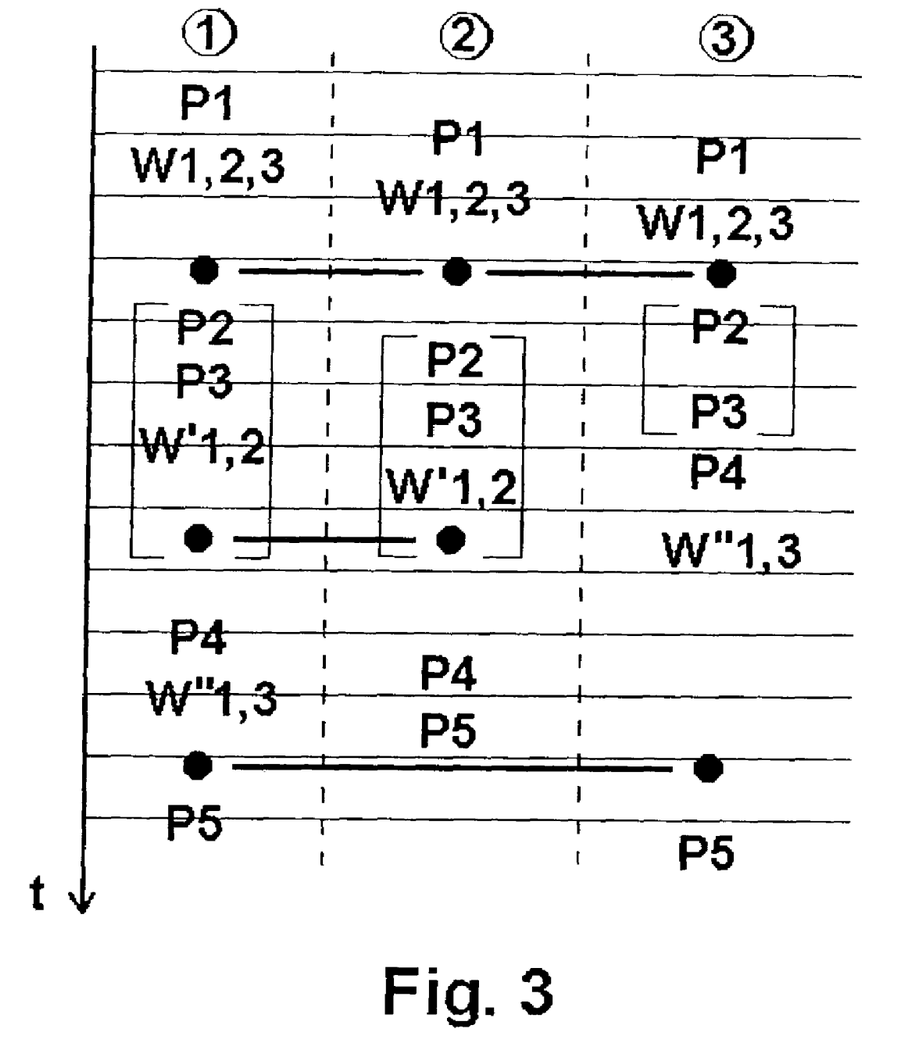
FIG. 3 A time-resolved example for a partly synchronized cooperation between three robots.
Figure 4:
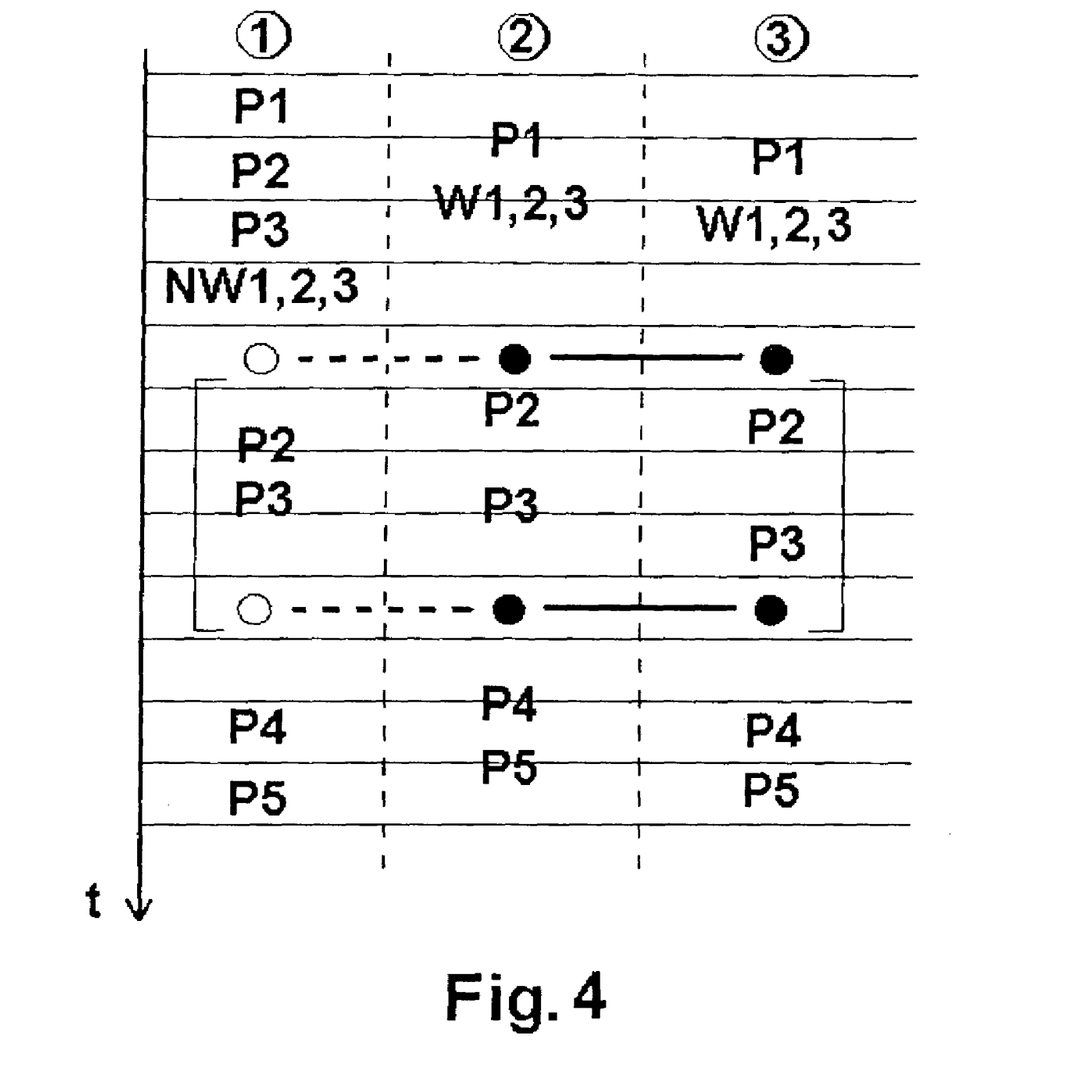
FIG. 4 Another time-resolved example of a partly synchronized cooperation between three robots.

The following FIGS. 3 and 4 constitute examples of synchronized control sequences.

In FIG. 3 are shown in time-resolved form control or movement sequences for three robots 1, 2, 3, t indicating the time coordinate. Specific points in the control program of robots 1, 2, 3 corresponding to specific points of a robot movement together with the corresponding orientation of the robot links are designated Pi (I=1, 2, . . . ). W, W', W'' indicate synchronization instructions with set wait option for different synchronization points and the following digits designate the participating robots 1, 2, 3. Synchronization points are in the form of black circles and the horizontal lines make it clear as to between which robots 1, 2, 3 synchronization is taking place. Square brackets indicate repeated control or movement sequences. The thin, horizontal lines indicate identical times t and serve merely to provide a better time orientation.

In the case of FIG. 3 initially all three control units are synchronized with one another and on reaching the program point P1 wait for another (W1, 2, 3). In the following program sequence there is a repeated synchronization of robots 1 and 2 (W'1, 2), whereas independently thereof robot 3 repeatedly moves to points P2–P4. This is followed by a synchronization between robots 1 and 3 (W2'1, 3). W, W' and W" stand for synchronization points, which are in each case clearly identified with another string. Thus, e.g. synchronization point W can be designated "start", synchronization point W' "fetch" and synchronization point W" "end".

FIG. 3 also makes it clear that any interconnected configured control unit can be randomly synchronized with any other control unit. Other than in the known control methods, there is no master control, which must necessarily participate in every synchronization.

FIG. 4 shows the sequencing of control sequences using the nowait option. The designations correspond to those of FIG. 3 and NW indicates the no-wait option.

After reaching point 23, the control unit of robot 1 encounters a synchronization instruction where the wait option 4.2 is not set (value 0; cf. FIG. 2a), so that the control unit merely transmits a message, e.g. of the type of control information 4', to the control units of robots 2 and 3, but does not itself wait at the synchronization point. The data structures 4 of robots 2 and 3 contain a set wait option W1, 2, 3 (value 1), so that their controls wait for one another at the synchronization point and for the message 4' of robot 1. This process can be repeated and otherwise precisely corresponds to the representation of FIG. 1.

The control sequence of FIG. 4 e.g. codes a situation in which the robot 1 must deposit a component in an apparatus, which is subsequently synchronously handled by robots 2 and 3. Correspondingly the ID string 4.1 of instruction W1, 2, 3/NW1, 2, 3 can be "deposit" or the message 4' can contain corresponding identification data 4. 1'. In this example robot 1 has the nowait option in its program synchronization instruction, because robot 1, unlike robots 2 and 3, does not have to wait on reaching the synchronization point. Robot 1 indicates to robots 2 and 3 that it has already been at the synchronization point. The latter wait for one another and for robot 1 to indicate its arrival at the synchronization point.

Figure 5:
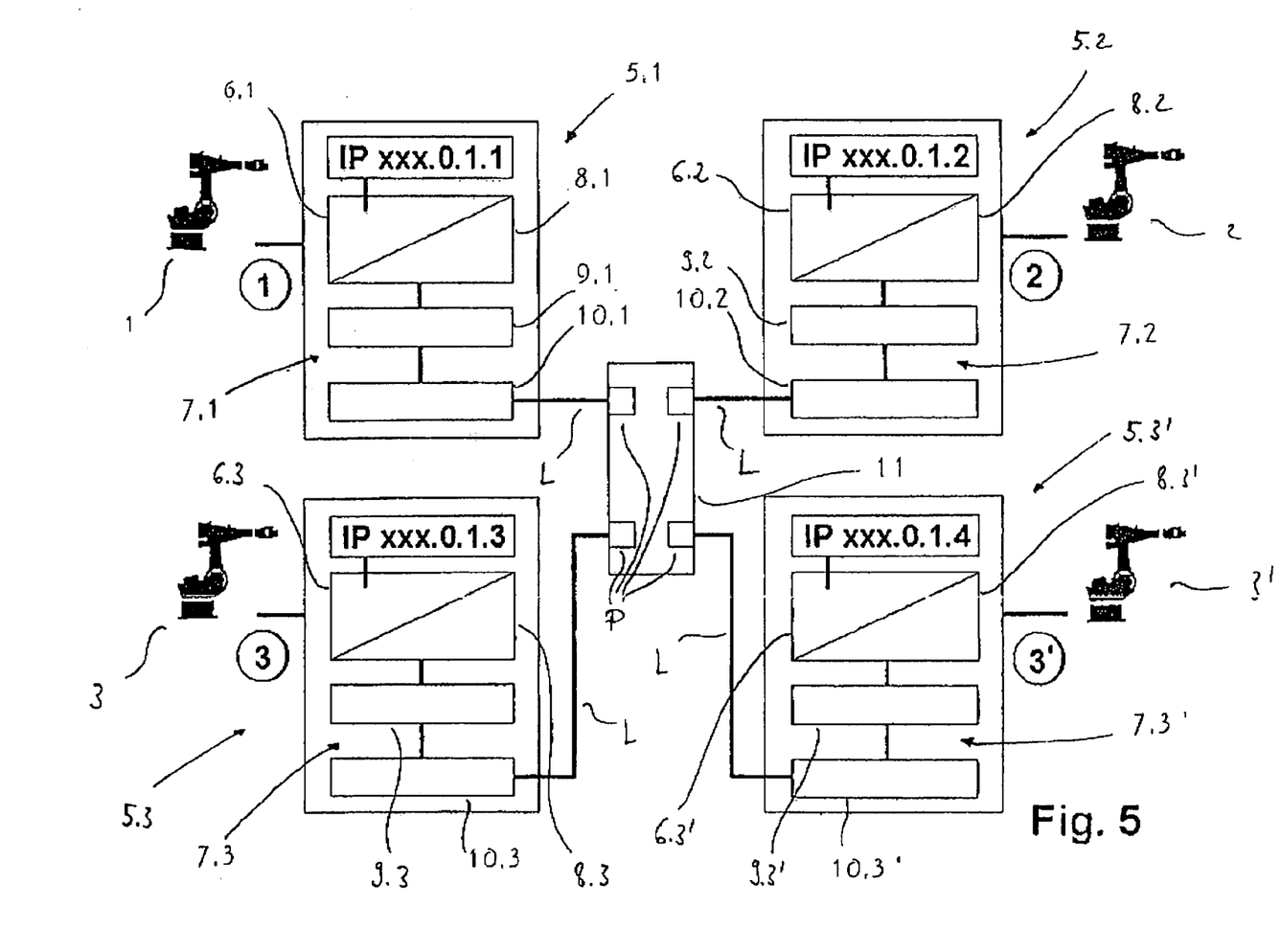
FIG. 5 A block diagram of an embodiment of the control system according to the invention.

FIG. 5 shows by means of a block diagram the structure of a control system of the inventive apparatuses for the synchronous control of several robots 1, 2, 3, 3'. Each robot 1, 2, 3, 3' has a control unit 5.1, 5.2, 5.3, 5.3' and each of these has at least storage means 6.1, 6.2, 6.3, 6.3' for at least storing a control program for the robot, communication means 7.1, 7.2, 7.3, 7.3' for transmitting and receiving control information 4' (cf. FIG. 2a) to or from other control units 5.1–5.3' to be synchronized and processor means 8.1, 8.2, 8.3, 8.3' for executing the control program as a function of the received control information 4'. In the embodiment shown, each of the communication means 7.1–7.3' have driver means 9.1, 9.2, 9.3, 9.3', e.g. Ethernet driver means, and a network card 10.1, 10.2, 10.3, 10.3'. By means of communication lines the control units 5.1–5.3' are connected to the ports P of a hub 11 and are in this way interlinked. In the simplest case of a passive hub 11, a data packet arriving at one port P is distributed over all the other ports P and is consequently made visible for all other segments of the net, i.e. the control units 5.1–5.3' with the associated lines L. A switching hub (switch) records the target address of a data packet and only forwards it to the corresponding port P.

The storage means 6.1–6.3' of the control units 5.1–5.3', apart from storing control programs, also file IP addresses of the particular control unit through which the control units can be clearly identified and operated.

In the communication of the star interconnected control units 5.1–5.3' the latter are completely balanced. None of the control units has a master status and can therefore handle program synchronizations according to the invention with any other control unit.

Figure 6:
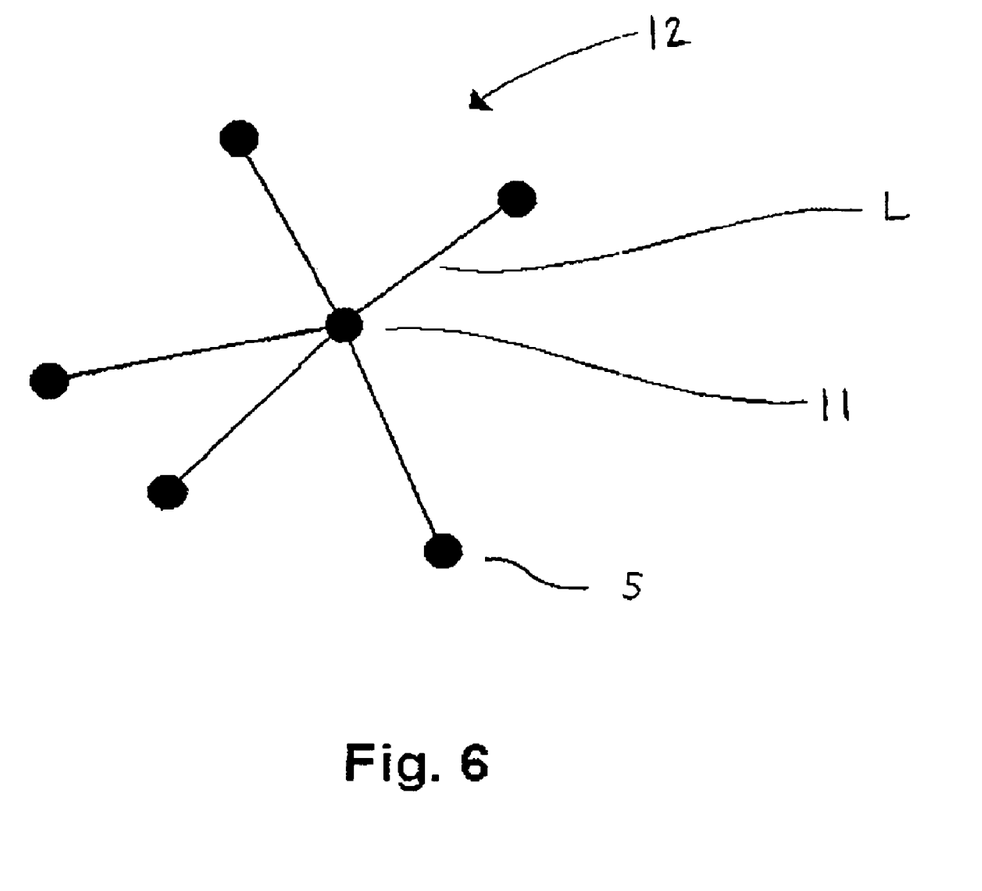
FIG. 6 A diagrammatic representation of the communication network used in the invention.

FIG. 6 again diagrammatically shows in simplified form the topology of the communication net 12 according to the invention in the form of a star topology with central hub 11 and segments L, at whose ends are provided nodes in the form of robot control units 5.1–5.3'.

REFERENCE NUMERALS LIST 1, 2, 3, 3' Robot
4 Data structure
4.1 Identification string
4.2 Synchronizing option
4.3 Control list
4' Control information
4.1' Identification string
4.2' Control address
5.1, 5.2, 5.3, 5.3' Control units
6.1, 6.2, 6.3, 6.3' Storage means
7.1, 7.2, 7.3, 7.3' Communication means
8.1, 8.2, 8.3, 8.3' Processor means
9.1, 9.2, 8.3, 9.3' Driver means
10.1, 10.2, 10.3, 10.3' Network card
11 Hub
12 Net
L Communication line/net segment
P Port
NW No-wait option
W Wait option
Pi (Synchronization) point
$x_1$ Location

The invention claimed is:

1. A method for the synchronous control of several manipulators; wherein control units of specific manipulators exchange control information according to data structures contained in a corresponding control program, through which control units to be synchronized and synchronization points in the control programs taking place there can be clearly identified, and wherein on reaching the synchronization points the program sequence in the control units to be synchronized is continued according to the contents of the data structures in conjunction with already exchanged control information or interrupted until corresponding control information arrives from other control units to be synchronized.

2. The method according to claim 1, wherein the control information is transmitted by the transmitting control unit at a time at which said transmitting control unit reaches a synchronization point.

3. The method according to claim 1, wherein data structures define at least identification data for the synchronization points, option data for program sequence control and address data of the control units to be synchronized.

4. The method according to claim 1, wherein the information exchange takes place between control units being on equal voting.

5. An apparatus for the synchronous control of a manipulator; in a group of interconnected control units of a plurality of manipulators, comprising:
- storage means at least for storing a control program for the manipulator,
- communication means for transmitting and receiving control information to or from other control units to be synchronized and
- processor means for executing the control program as a function of the control information received, wherein
- the storage means additionally store a plurality of control relevant data structures,
- the control data contained in the data structures clearly identify synchronization points in the control program and the control units to be synchronized,
- the control information are transmitted essentially at times at which at least one of said control units to be synchronized and the corresponding manipulator reach any one of said of reaching synchronization points, and
- the program sequence in the processor means or a corresponding movement of the manipulator, according to the control data contained in the data structures in conjunction with already exchanged control information can be continued or can be stopped at least up to the reception of corresponding control information from other control units to be synchronized.

6. The apparatus according to claim 5, wherein the data structures at least contain:
- identification data for the synchronization points,
- option data for program sequence control and address data of the control units to be synchronized.

7. The apparatus according to claim 6, wherein the identification data are in the form of strings.

8. The apparatus according to claim 6, wherein the option data are simple binary digits.

9. The apparatus according to claim 6, wherein the address data are in the form of a list of IP addresses.

10. The apparatus according to claim 5, wherein it is connected by a communication net with star topology to The other control units to be synchronized.

11. The apparatus according to claim 10, wherein the communication net has a hub for distributing control information.

12. The apparatus according to claim 5, wherein the control information at least contain:
- identification data for the synchronization points reached, and
- address data for identifying an apparatus transmitting said control information.

13. The apparatus according to claim 5, wherein said control units to be synchronized are placed on a common hierarchic plane.

14. The apparatus according to claim 5, wherein said control information comprise information indicating that said other control units to be synchronized and the corresponding manipulators have reached a common synchronization point.

15. A group of at least two apparatuses according to claim 5.

* * * * *